United States Patent
Bunin et al.

(10) Patent No.: US 9,594,743 B2
(45) Date of Patent: Mar. 14, 2017

(54) HYBRID MACHINE-USER LEARNING SYSTEM AND PROCESS FOR IDENTIFYING, ACCURATELY SELECTING AND STORING SCIENTIFIC DATA

(71) Applicant: Collaborative Drug Discovery, Inc., Burlingame, CA (US)

(72) Inventors: Barry A. Bunin, Belmont, CA (US); Nadia K. Litterman, Millbrae, CA (US); Alex Clark, Burlingame, CA (US)

(73) Assignee: Collaborative Drug Discovery, Inc., Burlingame, CA (US)

( * ) Notice: Subject to any disclaimer, the term of this patent is extended or adjusted under 35 U.S.C. 154(b) by 0 days.

(21) Appl. No.: 14/792,743

(22) Filed: Jul. 7, 2015

(65) Prior Publication Data
US 2016/0026622 A1   Jan. 28, 2016

Related U.S. Application Data

(60) Provisional application No. 62/029,220, filed on Jul. 25, 2014.

(51) Int. Cl.
*G06F 17/27* (2006.01)
*G06F 17/30* (2006.01)

(52) U.S. Cl.
CPC ........ *G06F 17/277* (2013.01); *G06F 17/2785* (2013.01); *G06F 17/30734* (2013.01); *G06F 17/274* (2013.01)

(58) Field of Classification Search
CPC .. G06F 17/2785; G06F 17/274; G06F 17/271; G06F 17/277; G06F 17/2755; G06F 17/2735; G06F 17/2795
USPC ............................................. 704/2, 7, 9, 10
See application file for complete search history.

(56) References Cited

U.S. PATENT DOCUMENTS

| | | | |
|---|---|---|---|
| 8,265,925 B2 * | 9/2012 | Aarskog | G06F 17/271 704/1 |
| 8,280,888 B1 * | 10/2012 | Bierner | G06F 17/277 704/4 |
| 2011/0047178 A1 * | 2/2011 | Song | G06F 17/3066 707/769 |
| 2014/0114649 A1 * | 4/2014 | Zuev | G06F 17/289 704/9 |

* cited by examiner

*Primary Examiner* — Vu B Hang
(74) *Attorney, Agent, or Firm* — Dinsmore & Shohl LLP

(57) ABSTRACT

A process for identifying, accurately selecting, and storing scientific data that is present in textual formats. The process includes providing scientific data located in a text document and searching the text document using a computer and selecting a plurality of key words and phrases using an algorithm. The selected key words and phrases are matched with a plurality of semantic definitions and a plurality of semantic definition-key words and phrase pairs are created. The created plurality of semantic definition-key words and phrase pairs are displayed to a user via a computer user interface and the user selects which of the created plurality of semantic definition-key words and phrase pairs are accurate. The process also includes storing the selected and accurate semantic definition-key words and phrase pairs in computer memory.

6 Claims, 16 Drawing Sheets

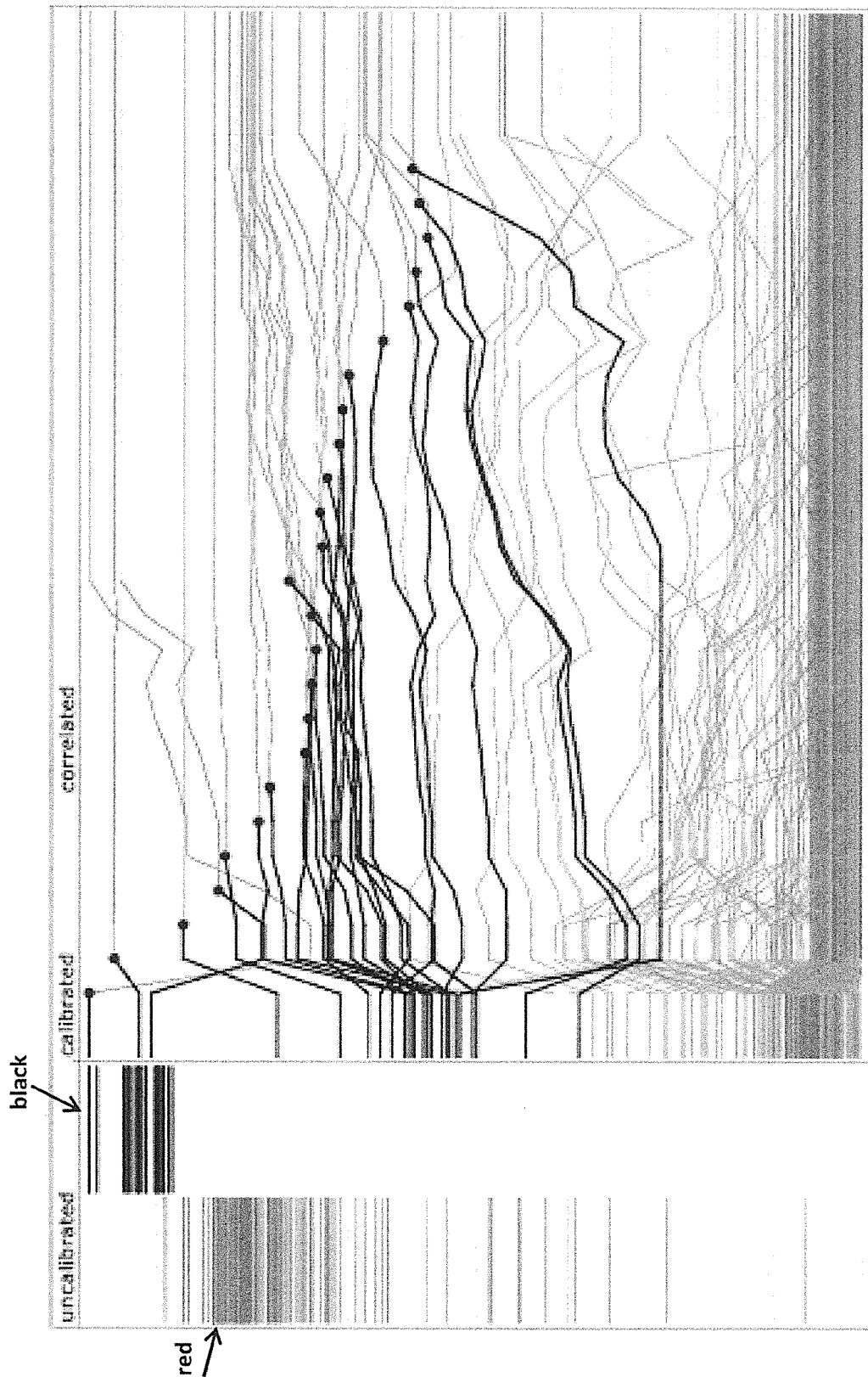

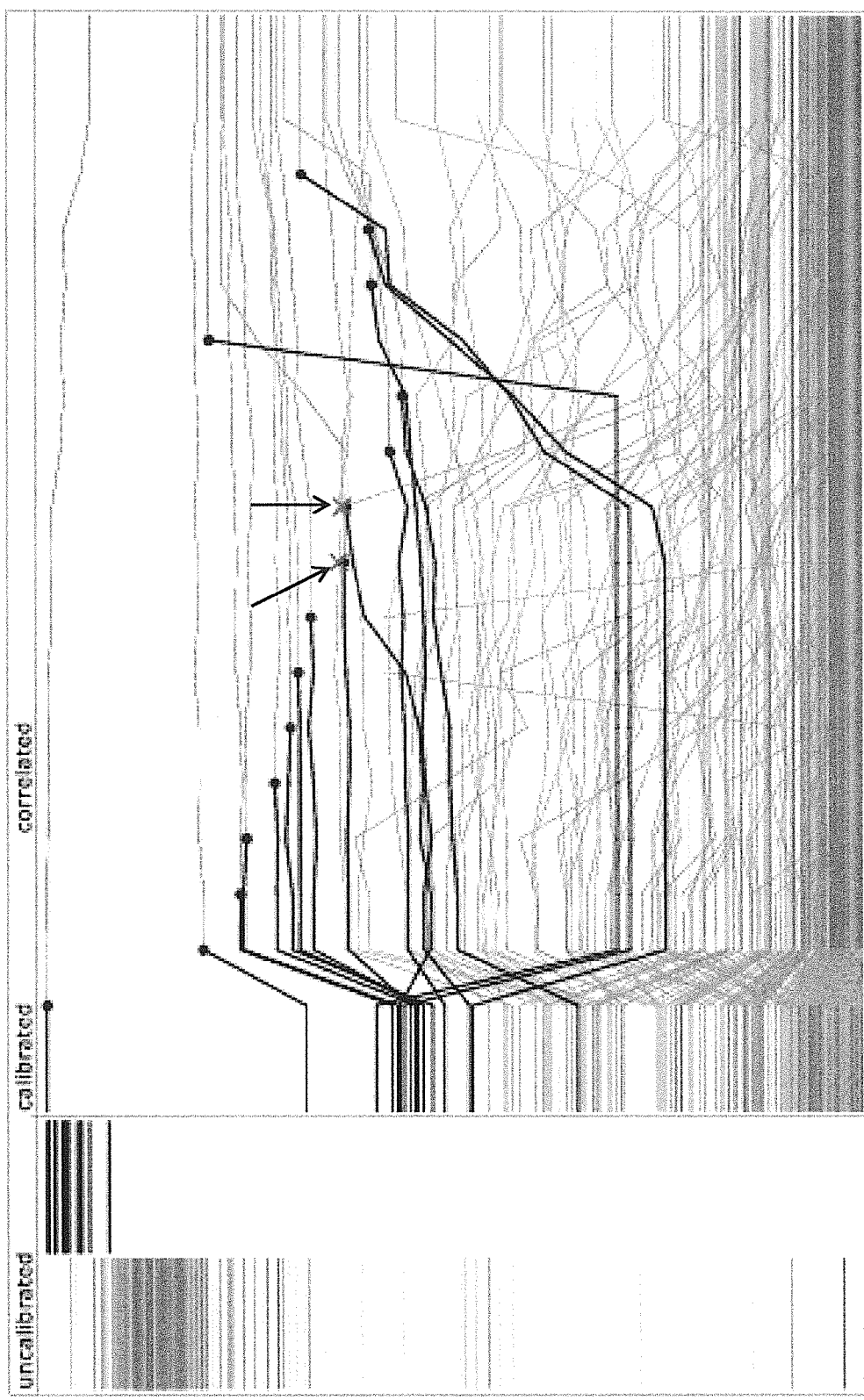

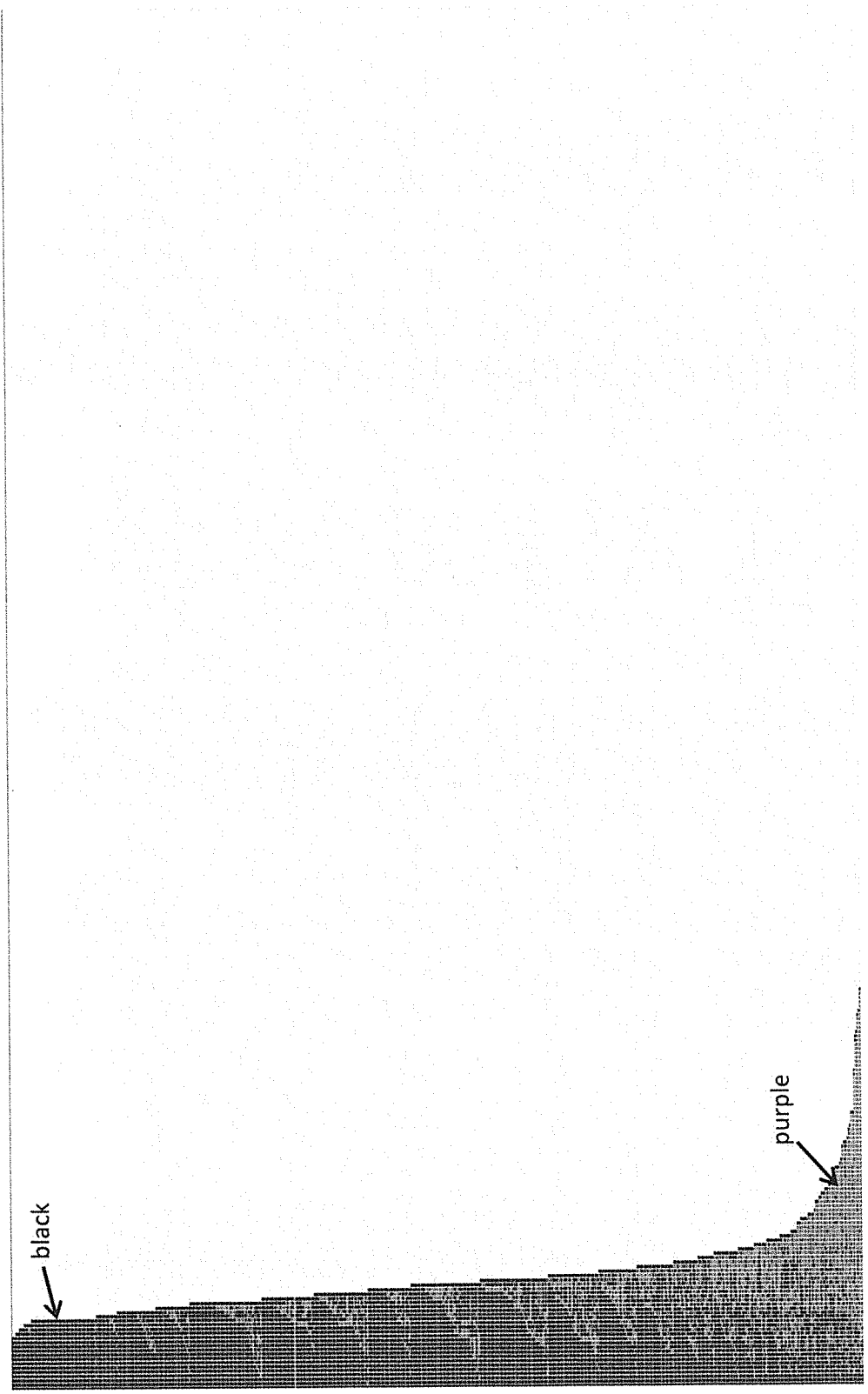

HTS to identify specific small molecule inhibitors of Ras and Ras-related GTPases. The assay described here is a no-wash fluorescent GTP-binding assay adapted to multiplexed, high-throughput measurements whereby multiple GTPases are simultaneously screened against the MLSCN library. The specificity is based on the observation that individual GTPases including wt and activated forms exhibit measurably distinct affinities for Bodipy-Fl-GTP vs GTP. The multiplex assay involves the binding of fluorescent GTP to G protein-GST fusion proteins on GSH beads. A set of six G proteins (Rac 1 wt, Rab7 wt, Rac 1 activated, Ras wt, Rab 2 wt., CDC wt) are arrayed under conditions of divalent molecule depletion in the assay reported here. Beads are washed in wash buffer (0.1% BSA and 1mM DTT). Bead sets are coated with individual GST-small G proteins, blocked with 0.1% BSA in Buffer (0.01% NP-40; 30nM HEPES pH 7.5; 100nM KCl; 20nM NaCl; 1mM EDTA) and incubated overnight at 4 degrees C. The assay is conducted in 384-well microplates in a total well volume of 10.1 microliters (5 microliters of bead mixture, 0.1 microliters of test compound, and 5 microliters of 200nM Bodipy-FL-GTP in buffer containing BSA and DTT for a final concentration of GTP of 100nM). Positive Controls, which contains bead mixture and fluorescent GTP but no test compound, are located in columns 1 and 2 on plate. Negative Controls, bead mixture with fluorescent GTP and 0.5 mM unlabeled GTP, are collected from a separate test tube. Plates are placed on rotators and incubated for 40-45 minutes at 4 degrees C. Sample analysis is conducted with the HyperCyt(R) high throughput flow cytometry platform. Flow cytometric data of light scatter and fluorescence emission at 530 +/- 20 nm (FL1) and 665 +/- 10 nm (FL8) are collected via Cyan (Dako). The resulting time-resolved single data file per plate is analyzed by IDLQuery software to determine the compound activity in each well. Gating based on FL8 emission distinguishes the beads coated with different proteins, and the median fluorescence per bead population is calculated.

Fig-5(a)

HYBRID MACHINE-USER LEARNING SYSTEM AND PROCESS FOR IDENTIFYING, ACCURATELY SELECTING AND STORING SCIENTIFIC DATA

CROSS-REFERENCE TO RELATED APPLICATIONS

The present application claims priority to U.S. Provisional Application No. 62/029,220 filed on Jul. 25, 2014, the contents of which are incorporated herein in their entirety by reference.

FIELD OF THE INVENTION

The present invention is related to a hybrid machine-user learning system, and in particular to a hybrid machine-user learning system and process for identifying, accurately selecting, and storing scientific data.

BACKGROUND OF THE INVENTION

The digitization of scientific data is known. For example, authors prepare manuscripts and presentations using a collection of text, graphics and data processing software. Also, consumers of scientific data regularly download documents from publishers' websites, search for content in databases, and share data with their colleagues electronically, often in an entirely paperless fashion.

In addition to the above, dozens of commercial and academic research groups are actively working on ways to use software to analyze this rapidly expanding corpus of data to provide facile information retrieval, and to build decision support systems to ensure that new research makes the best possible use of all available prior art. However, and despite the near complete migration from paper to computers, the style in which scientists express their results has barely changed since the dawn of scientific publishing. In particular, ideas and facts are expressed as terse paragraphs of text—kept as short as possible to minimize printing costs—and as stripped down diagrams that often summarize vast numbers of individual data points in a form that can be visualized statically by a scientific peer. This style of communication has remained consistent because it is effective for its primary purpose, but also presents a major hurdle to computer software that is attempting to perform data mining operations on published results.

In the case of biological assays, experiments designed to measure the effects of introduced substances for a model of a biological system or disease process, the protocols are typically described in one or more textual paragraphs. Information about the target biology, the proteins or cells, the measurement system, the preparation process, etc., are all described using information rich jargon that allows other scientists to understand the conditions and the purpose. This comprehension process is, however, expert-specific and quite time consuming. While one scientist may read and understand dozens of published assay descriptions, this is not scalable for large-scale analysis, e.g. clustering into groups after generating pairwise metrics, or searching databases for related assays. Therefore, an improved process and system for identifying and labeling or annotating scientific technical data would be desirable.

SUMMARY OF THE INVENTION

A process for identifying, accurately selecting, and storing scientific data that is present in textual formats is provided. The process includes providing a computer having an electronic control unit (ECU) with a processor, memory, and a user interface. The electronic control unit also has an algorithm for identifying key words and phrases that can be present in a textual format. The process also includes providing scientific data located in a text document and searching the text document using the computer and selecting a plurality of key words and phrases using the algorithm. The selected key words and phrases are matched with a plurality of semantic definitions and a plurality of semantic definition-key words and phrase (SD-KWP) pairs are created. The created plurality of SD-KWP pairs is displayed to a user using the computer user interface and the user selects which of the created plurality of SD-KWP pairs are accurate. The process also includes storing the selected and accurate SD-KWP pairs.

The algorithm can be a natural language program (NLP) algorithm, e.g. a Bayesian model NLP algorithm, however this is not required.

The text document can be a plurality of text documents such as a plurality of journal articles. The computer with the algorithm can search the text of the plurality of journal articles and the algorithm can select a plurality of key words and phrases from the articles. Furthermore, the semantic definitions can be BioAssay Ontology (BAO) project semantic definitions. In such instances, the plurality of SD-KWP pairs can be BAO semantic definition-POS-tagged block pairs. Finally, the stored accurate SD-KWP pairs can be stored in a Resource Description Framework (RDF) triple format.

The process affords for textual documents such as journal articles, dissertations, and the like to be searched with the computer, key words and phrases related to a desired scientific field to be automatically identified by the algorithm, and semantic definitions within the desired scientific field to be automatically associated with the identified key words and phrases by the computer. Also, a plurality of SD-KWP pairs can be created and displayed to a user via the computer user interface. The user can then select which of the displayed SD-KWP pairs are accurate, which in turn affords for the selected and accurate SD-KWP pairs to be stored for further searching. In this manner large-scale analysis of published scientific research can be performed via clustering into groups of generated pairwise metrics.

BRIEF DESCRIPTION OF THE DRAWINGS

FIG. 2(a) is a representative example of model building in action and showing relative ranking of uncalibrated, calibrated, and stepwise application of correlation models with the example referring to PubChem entries by assay ID 574;

FIG. 2(c) is a representative example of model building in action and showing relative ranking of uncalibrated, calibrated, and stepwise application of correlation models with the example referring to PubChem entries by assay ID 348;

FIG. 3(d) is a plot of effectiveness of ranking of activities for hit/miss for training data;

FIG. 5(a) is a schematic illustration of a stepwise annotation process for PubChem Assay ID 761 and showing the bioassay protocol;

DETAILED DESCRIPTION OF THE PREFERRED EMBODIMENTS

Figure 1A:
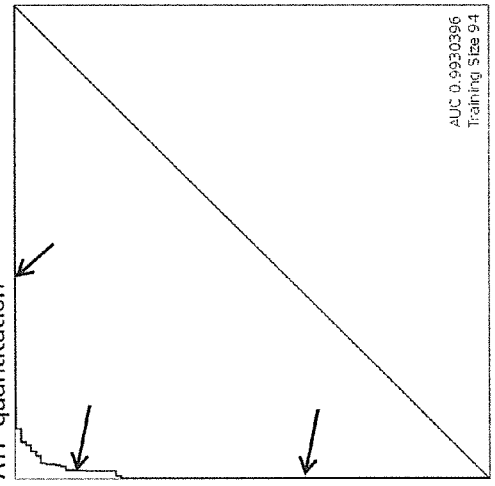
FIG. 1(a) is a selected leave-one-out ROC plot for annotation and using a Bayesian learning model derived from marked-up natural language processing and having an "ATP quantitation" assay method.

A system and/or process for identifying, accurately selecting and storing scientific data that is present in textual form, e.g. in a journal article, is provided. As such, the system and/or process has use for aiding in scientific research.

A system for identifying, accurate selecting and storing scientific data in textual formats includes a computer having an electronic control unit with a processor, memory, an algorithm for identifying key words and phrases that are present in a textual format and a user interface. The computer is operable to:

search text and identify key words and phrases related to a desired scientific field;

associate said identified key words and phrases with semantic definitions of a desired ontology;

create a plurality of semantic definition-key words and phrases pairs;

display said plurality of semantic definition-key words and phrases pairs to a user via said user interface;

allow the user to select which displayed semantic definition-key words and phrases pairs are accurate;

store said accurate semantic definition-key words and phrases pairs; and optionally search said stored accurate semantic definition-key words and phrases pairs.

The process for identifying, accurate selecting and storing scientific data in textual formats includes providing the computer having the electronic control unit with the processor, memory, algorithm for identifying key words and phrases that are present in a textual format and the user interface. In addition, scientific data located in a text document is provided. The text document is searched and a plurality of key words and phrases are selected using the algorithm. Next, key words and phrases are matched with a plurality of semantic definitions and a plurality of semantic definition-key words and phrases pairs are created. The created plurality of semantic definition-key words and phrases pairs are displayed to a user. The user can then select which of the created plurality of semantic definition-key words and phrases pairs are accurate via the user interface and the selected and accurate semantic definition-key words and phrases pairs can be stored for future searching.

In some instances, the algorithm is an NLP algorithm, and preferably can be a Bayesian model NLP algorithm. In addition, the text document can be a plurality of text documents, e.g. a plurality of journal articles.

The semantic definitions can be BioAssay Ontology (BAO) project semantic definitions and the plurality of semantic definition-key words and phrases pairs can be BAO semantic definition-POS-tagged block pairs. Finally, the stored accurate semantic definition-key words and phrases pairs can be stored in an RDF triple format.

In one embodiment, annotation of bioassay protocols, in a significant level of detail, such that the semantic content is a relatively complete description of the assay is provided. In such instances, existing vocabularies are drawn upon, such as the BioAssay Ontology (BAO), and other ontologies, which it in turn references, for the means to complete a description. In addition, natural language processing and machine learning techniques, with algorithms coupled to a user interface with a workflow design that iterates back and forth between automated inference and operator approval is provided. In this manner, a user can quickly determine which annotations are accurate.

In addition to the above, the system and/or process disclosed herein eliminates most of wrong answers instead of seeking an algorithm to provide accurate answers most if not all of the time. As such, a user-facing service for which the scientist simply selects correct semantic markup options from a short list of options proposed by the software is provided. This is as opposed to the entirely manual curation approach, which would require the operator to navigate through a densely packed hierarchy of descriptors. By reducing the burden of markup to mere minutes by somebody who is not familiar with semantic technology, and has had no special training for use of the software, it is quite reasonable to expect scientists to use this software as part of their standard write-up and submission process.

As the number of correctly annotated bioassay protocols grows, improved training sets are provided, as well as machine learning algorithms with improved accuracy. Once the currently high barrier to adoption has been overcome, and semantic markup of scientific knowledge such as biological assay experiments is routine, assay protocols will be as readable to computer software as they are to expert scientists. The informatics capabilities that this will unlock are essentially limitless, but the first most clear example is the ability to search assays for specific properties, e.g. target, assay type, cell line, experimental conditions, etc. Being able to conveniently organize and aggregate assays by particular characteristics, cluster by similarity, or assemble chemical structures and activity from multiple assays based on customizable criteria, are all advantages that have a direct impact on drug discovery, which is currently held back by the lack of semantic annotation. Once the corpus of marked up annotations becomes large, it will also be possible to construct data mining algorithms to study large scale trends in bioassay data, which will result in entirely new kinds of insight that are currently not possible.

In order to better teach the invention, but not limit its scope in any way, one or more examples are provided below.

The primary annotation reference disclosed herein is the BioAssay Ontology (BAO), which is available from http://bioassayontology.org, and can be downloaded in raw RDF format. The BAO classes refer to a number of other ontologies, and of particular relevance are the Cell Line Ontology (CLO) (Sarntivijai 2011), Gene Ontology (GO) (Balakrishnan et al. 2013; Blake 2013), and NCBI Taxonomy (Federhen 2012), all of which are used for annotations within a training set. All of the source files for these ontologies were loaded into a SPARQL server (Apache Fuseki)(Website 2014a). SPARQL queries were used to organize available values that correspond to each of a plurality of property groups. It is appreciated that other known annotation references fall within the scope of the present invention, as well as annotation references to be developed in the future.

In order to test the methodology of using text to create suggested annotations, a corpus of annotated bioassays that were provided by the BAO group (Schurer et al. 2011; Vempati et al. 2012) was used. As part of the testing process for the BioAssay Ontology project, a simple annotation user interface was created in the form of an Excel spreadsheet template. Approximately 1000 assays were selected from PubChem, and each of these was painstakingly annotated, leading to an output document taking the form of: <assay ID> <property> <value>.

For each assay, 20-30 annotations were incorporated into the training set. The property values were individually mapped to the BAO space, e.g. 'has assay method' is mapped to the URI http://vvww.bioassayontology.org/bao#BAO_0000212, which is a part of the BAO ontology. Values that are string literals are not included in the training data. Those which map to a distinct URI are typically part of the BioAssay Ontology directly, or part of other ontologies that are referenced, such as the Cell Line Ontology (CLO), Gene Ontology (GO) and NCBI Taxonomy.

Once the annotations had been suitably collated for each distinct assay, the NCBI PubChem assays were obtained by a simple script making a call to the PUG RESTful API (Website 2014b). In each case, the description and protocol sections of the resulting content were merged into a free text document. The manner in which these two fields are used by scientists submitting new assay data varies considerably, but they are generally complete. For the collection of text documents obtained, it was necessary to manually examine each entry, and remove non-pertinent information, such as attribution, references and introductory text. The residual text for each case was a description of the assay, including information about the target objective, the experimental details, and the materials used. The volume of text varies from concisely worded single paragraph summaries to verbosely detailed page length accounts of experimental methodology.

The OpenNLP project (Website 2014c), which provides part of speech (POS) tagging capabilities, using the default dictionaries that have been trained on general purpose English text, was used to classify text in terms of classified tokens that could be partially understood by computer software. The POS tags represent each individual word as a token that is further annotated by its type, e.g. the words "report" and "PubChem" were classified as an ordinary noun and a proper noun, respectively:

(NN report)
(NNP PubChem)
Blocks of text are classified in an increasingly specific hierarchical form, e.g.
(NP (DT an) (JJ anti-cancer) (NN drug))
(VP (VBG developing) (NP (JJ potential) (JJ human) (NNS therapeutics)))
(NP (NP (NN incubation)) (PP (IN with) (NP (NN test) (NN compound))))
(NP (NP (DT the) (JJ metabolic) (NN activity)) (PP (IN of) (NP (DT a) (NN suspension) (NN cell) (NN line))))
(VP (VB measure) (SBAR (WHADVP (WRB when)) (S (VP (VBG developing) (NP (JJ potential) (JJ human) (NNS therapeutics))))))
(NP (JJ luciferase-based) (NN cell) (NN proliferation/viability) (NN assay) (NN endpoint))

An assay description of several paragraphs can generate many hundred distinct instances of POS-tagged blocks. These marked up tokens contain a far larger amount of information about the composition of the sentence than the words themselves. While building a model by correlating words with annotations would be expected to achieve poor results, including markup information about how the words are used in conjunction with each other might be able to achieve far greater discrimination. For example, the POS-tagged block "(NP (DT an) (JJ anti-cancer) (NN drug))" represents the words [an, anti, cancer, drug]. Each of these 4 words taken out of context could be found in almost any assay description, but when they are associated together in context, contribute an important statement about the corresponding biochemistry.

By collecting all sizes of POS-tagged blocks, up to a certain limit, it is possible to give many different depths of linguistic structure the opportunity to distinguish themselves within a model. In some cases a single word can have significant meaning on its own, especially proper nouns or jargon (e.g. "luciferase"), and are likely to have a high correlation to certain kinds of annotations (e.g. use of a luciferase-based assay). Other words are general to the English language, or occur frequently in assay descriptions, such that they only have value in their proper context (e.g. "interaction").

One of the useful properties of scientific writing is that authors have self-organized around a narrow range of styles for presenting information such as assay descriptions. While the explicit intent may not have been for the benefit of computerized natural language processing, the motivation is the same: scientific authors also read many other published descriptions, and it is in the best interests of the community to maintain a certain degree of consistency as well as brevity. Because the literary style lacks prose and has a relatively little variation, there are certain blocks of words, as identified by the POS-tagging, that are frequently correlated with particular concepts, and hence the semantic annotations.

It is appreciated that a collection of hundreds of assay descriptions will result in thousands of distinct POS-tagged blocks after processing each of them with natural language analysis, and while certain blocks are likely to be specifically correlated with certain annotations, there are many more with only weak correlation or none at all. Matching thousands of potentially important tags with hundreds or thousands of annotations requires the selection of an algorithm with favorable scaling properties, and is well beyond the scope of manual curation.

In view of the above, a variation of Bayesian inference was applied and the Laplacian-modified naïve Bayesian variant is highly tolerant of large numbers of parameters. The score for each annotation is calculated as:

$$\text{score} = \sum_n \ln\left[\frac{A_n + 1}{T_n \cdot P + 1}\right]$$

where n is the tagged natural language block, $A_n$ is the number of documents containing the annotation and the tagged block, $T_n$ is the total number of documents with the tagged block, and P is the fraction of documents containing the annotation. The score is computed by adding up the logarithms of these ratios, which circumvents issues with numeric precision, but produces a score with arbitrary scale, rather than a probability.

Figure 1B:
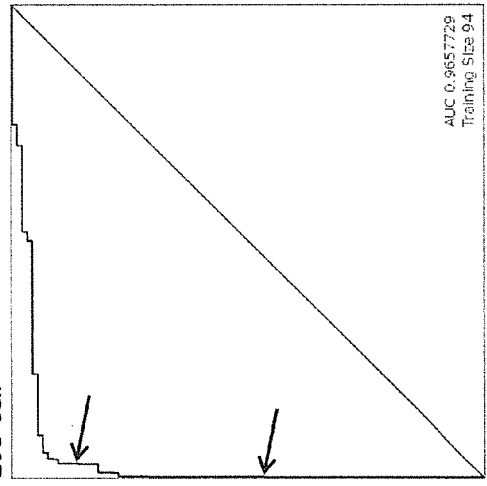
FIG. 1(b) is a selected leave-one-out ROC plot for annotation and using a Bayesian learning model derived from marked-up natural language processing and having a "293 cell" cell line.
Figure 1C:
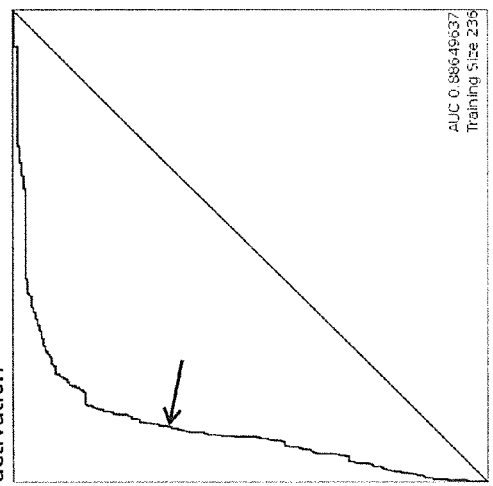
FIG. 1(c) is a selected leave-one-out ROC plot for annotation and using a Bayesian learning model derived from marked-up natural language processing and having an "activation" mode of action.
Figure 1D:
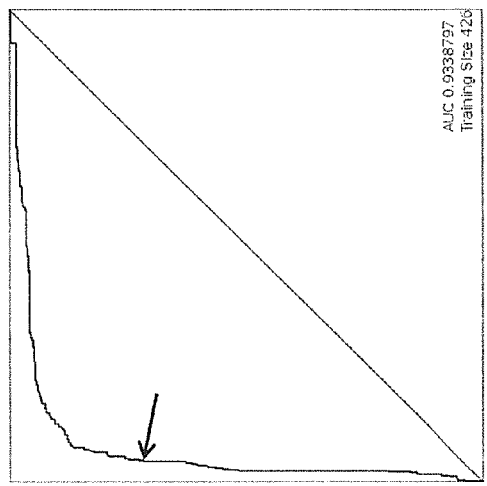
FIG. 1(d) is a selected leave-one-out ROC plot for annotation and using a Bayesian learning model derived from marked-up natural language processing and having a "DMSO" assay control.

Considering each individual annotation as a separate observable, building a Bayesian model using the presence or absence of each distinct POS-tagged block gives rise to a highly favorable response for most annotations, as determined by the receiver-operator-characteristic (ROC) curves. Selected examples of these models are shown in FIG. 1. In particular, FIGS. 1(a) and 1(b) show annotations with high training set coverage that perform well, due in part to having relatively unambiguous word associations. For example, FIG. 1(a) has a word association "ATP quantitation" assigned to the property "assay method" and FIG. 1(b) has the word association "293 cell" with the property "cell line." In contrast, FIGS. 1(c) and 1(d) show well covered annotations that perform poorly, due to being reliant on terms ("activation" for the property "mode of action" and "DMSO" for the property "assay control") that can be used in a variety of contexts that do not necessarily imply the presence of the annotation and thus make it more difficult for the model to eliminate false positives. It is appreciated that the arrows in the figures highlight the coverage performed, i.e. the trace of the data line, for each annotation.

Figure 1E:
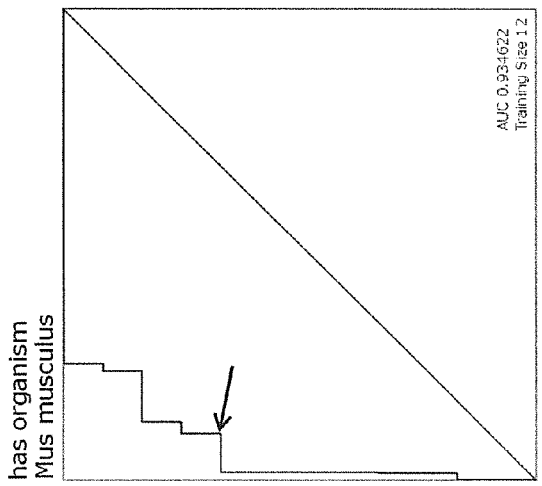
FIG. 1(e) is a selected leave-one-out ROC plot for annotation and using a Bayesian learning model derived from marked-up natural language processing and having a "BODIPY GTP" substrate.
Figure 1F:
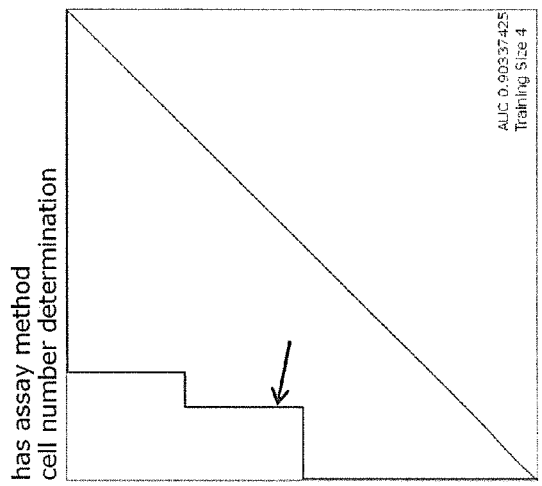
FIG. 1(f) is a selected leave-one-out ROC plot for annotation and using a Bayesian learning model derived from marked-up natural language processing and having a "3-0-methyl-fluorescein" measured entity.
Figure 1G:
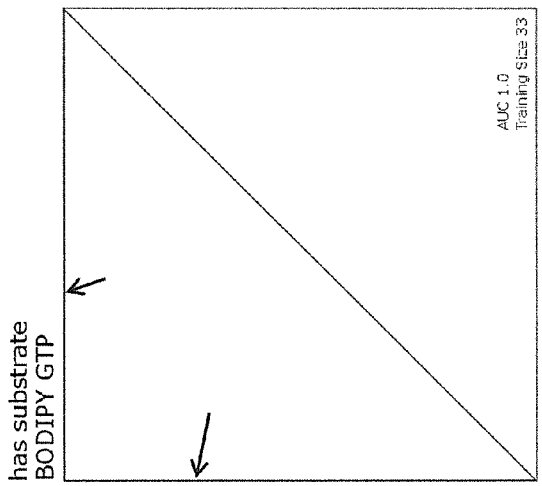
FIG. 1(g) is a selected leave-one-out ROC plot for annotation and using a Bayesian learning model derived from marked-up natural language processing and having a "*Mus musculus*" organism.
Figure 1H:
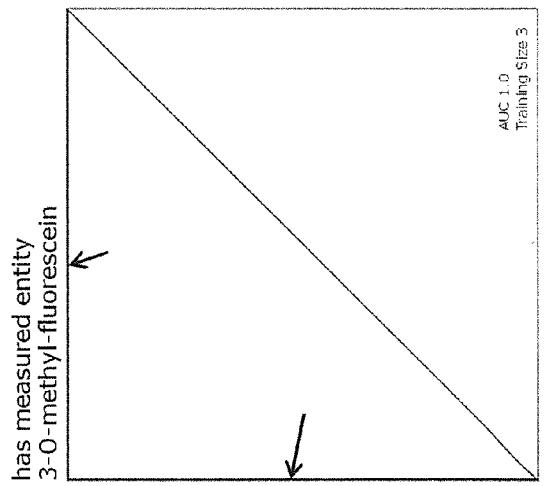
FIG. 1(h) is a selected leave-one-out ROC plot for annotation and using a Bayesian learning model derived from marked-up natural language processing and having a "cell number determination" assay method.

FIGS. 1(e) and 1(f) illustrate annotations with perfect recall for less well covered annotations such as "BODIPY GTP" for a property of "substrate" (FIG. 1(e)) and "3-O-methyl-fluorescein" for the property "measured entity." As shown in FIGS. 1(e) and 1(f), and highlighted by the arrows, the lines corresponding to training behavior fit exactly with the vertical axis and upper horizontal axis. Finally, FIGS. 1(g) and 1(h) which illustrate responses for the annotations "*Mus musculus*" for the property "organism" and the annotation "cell number determination" for the property "assay method," show relatively poor response due to a small training set and terminology with variations in wording style.

One of the disadvantages of using this Laplacian corrected variant is that the computed value is not a probability, but rather a score with arbitrary range and scale. This means that it is not possible to compare the outcomes from two separate models, which is a problem, since the objective of this technology is to rank the scores that are obtained from each separate model. In order to achieve the ranking, the scores need to be directly comparable, and hence be suitable for providing a list of suggestions for which annotations are most likely to be associated with the text.

In order to make the scores from each of the models comparable, each model requires a calibration function. This can be accomplished effectively by defining a simple linear correction for each model, of the form y=ax+b, which is applied to each score prior to inter-model comparison. Selecting appropriate values for a and b, for each model, can be achieved by picking initial values that map each of the model outcomes to the range 0 . . . 1, defining a score that quantifies how well the correct annotations are prioritized, and applying a brute force algorithm to iteratively refine the correction terms.

Besides consistent use of linguistic descriptions of assays, one of the other observations about the annotations defined for these assay protocols is that they are not in any way orthogonal: the degree to which the annotations are correlated is very high. For example, if it is known that the assay uses luciferin as a substrate, the probability that it also involves luminescence as a detection method is far higher than it would be if the prior fact had not already been established.

Given that the calibrated Bayesian models perform very well at placing the top few highest ranking annotations, then once these top scoring annotations have been confirmed by the user, the amount of information that can be inferred about the assay may be significantly greater, due to the high degree of correlation.

This second order correlation was implemented by building another set of Bayesian models with each possible annotation considered separately as an observation. For each document, each annotation's likely presence is modeled against the presence or absence of all the other annotations recorded for the document, e.g. when building the correlation model for annotation A, if document i contains annotations A, B and C, then it is considered to be "active", with priors B and C; if document j contains annotations B, C and D, it is considered "inactive", with priors B, C and D.

Thus, once one or more annotations have been assigned, the secondary Bayesian models are consulted, and the score for each of the annotations is modified by applying the correlation factor. Essentially this means that as the user approves annotations, the prediction scores of the remaining annotations tends to improve, as the correlations are factored in.

FIG. 2 provides an indication of how the ranking evolves during the model building steps, using four example documents. For each of these diagrams, the left hand side shows two bands which represent the uncalibrated predictions, which are linearly normalized so their values fall between the minimum and maximum scores from the raw Bayesian prediction score. The annotations that do not apply to the document are shown as red lines, while the annotations that are present are shown in black. The height of each line is indicative of its score. As can be clearly seen, the desired predictions score are significantly higher for those present (black lines) than those which are absent (red lines), but the extent to which the ranking separates the two groups varies, and is not initially a perfect separation for any of these examples.

The main area of each diagram shows the progression of the relative predictions: at the beginning of the sequence, the scores are ranked by the inter-model calibration functions, which typically results in a significant improvement. For each of the subsequent steps, the highest scoring correct annotation is added to the approved set, and the correlation model is updated and applied. The ranking is re-determined, and the next highest scoring correct annotation is selected. The diagram indicates the point at which each annotation is selected by plotting a black circle, and changing the color of the line to green: since it has been confirmed, its ranking order is no longer a concern, though its presence continues to affect the way the correlation model is applied.

Figure 2B:
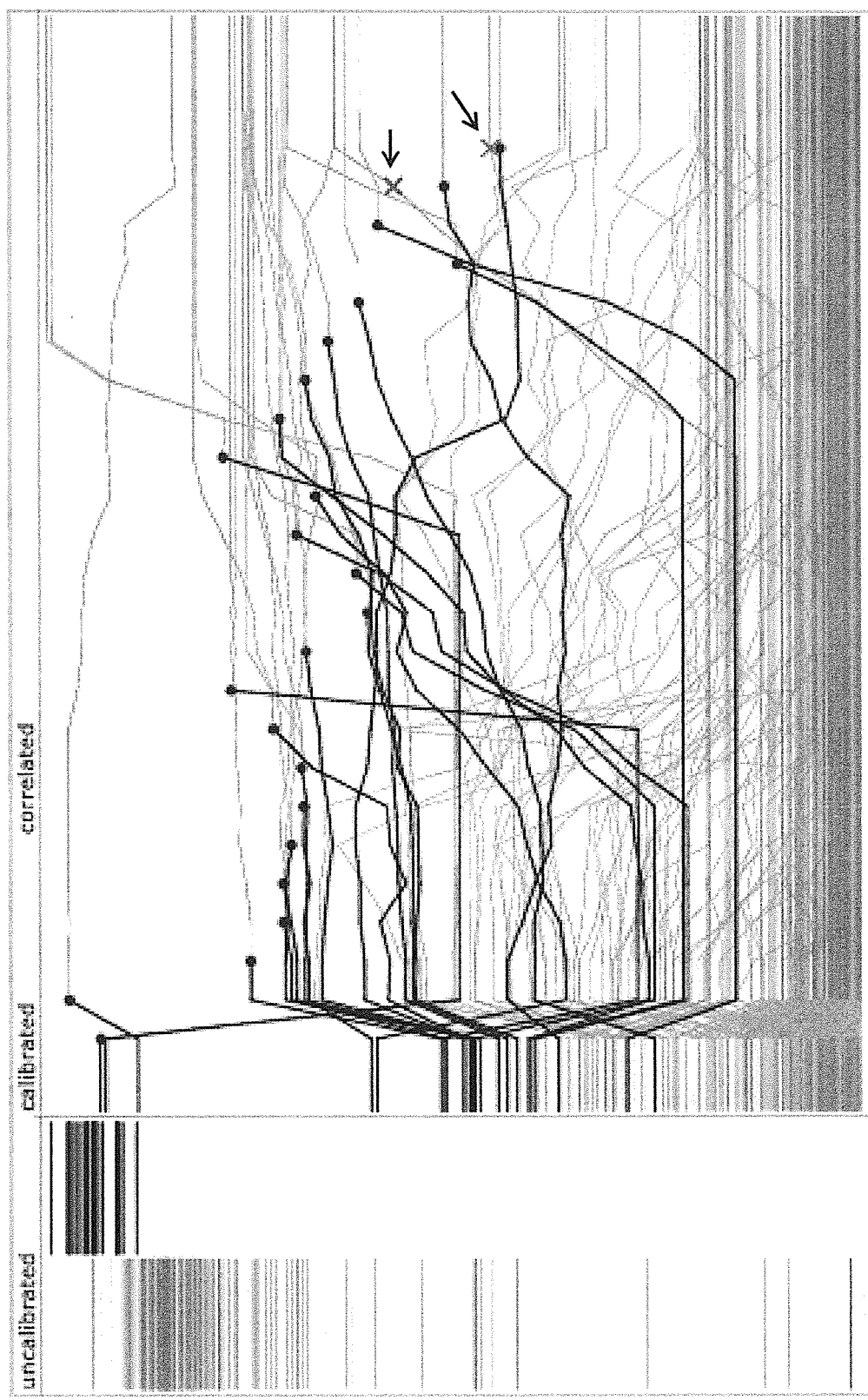
FIG. 2(b) is a representative example of model building in action and showing relative ranking of uncalibrated, calibrated, and stepwise application of correlation models with the example referring to PubChem entries by assay ID 436.
Figure 2D:
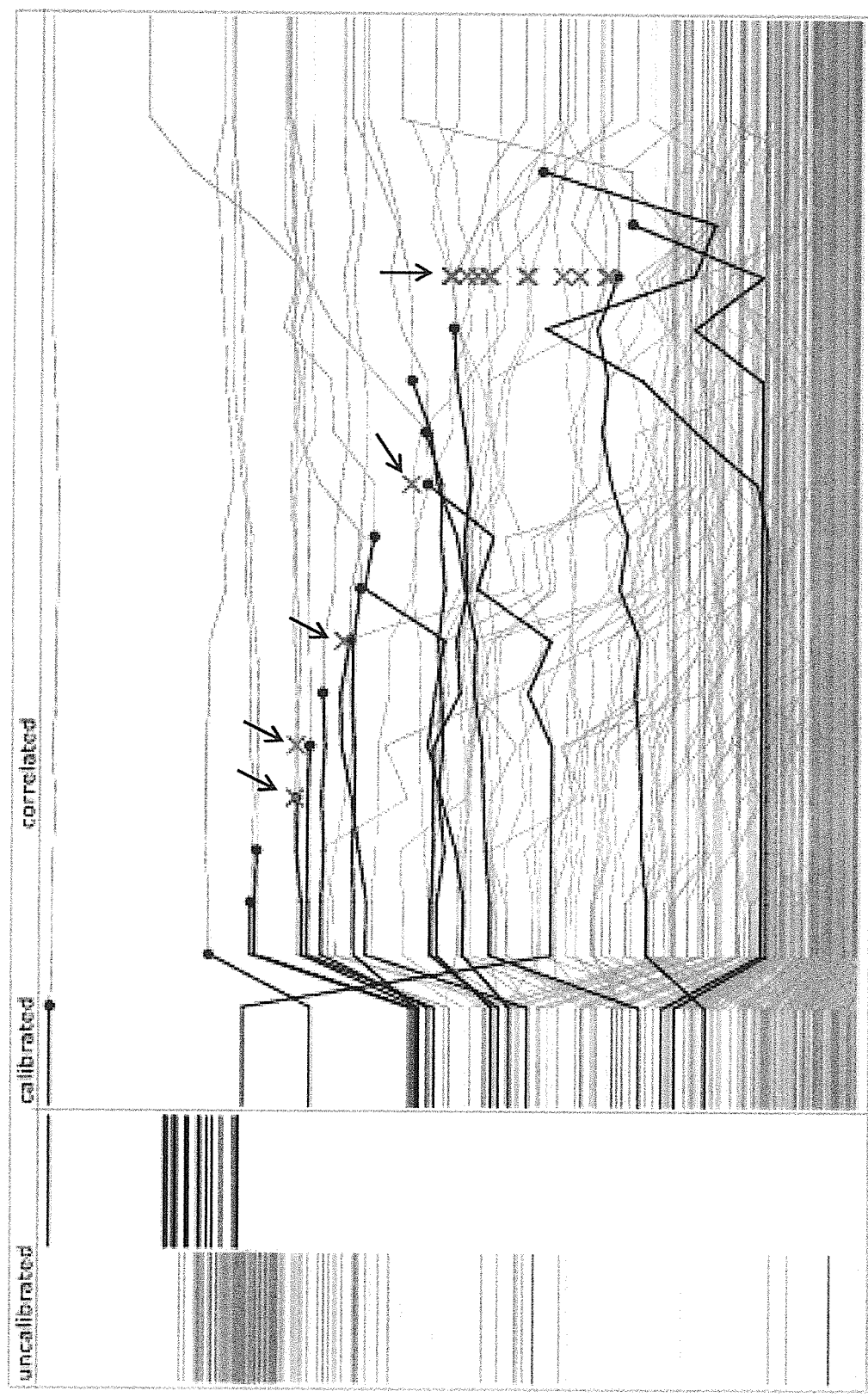
FIG. 2(d) is a representative example of model building in action and showing relative ranking of uncalibrated, calibrated, and stepwise application of correlation models with the example referring to PubChem entries by assay ID 346.

In the first example, shown in FIG. 2(a), application of these models in the given sequence provides a perfect result: in each case the highest scoring annotation yet to be selected is at the top of the list, with no false positives. In examples illustrated in FIGS. 2(b) and (c), the results are good but not perfect: the red cross marks (highlighted by arrows in the figures) indicate when an incorrect annotation was presented as the best next choice. In the example shown in FIG. 2(d), the response of the model is relatively poor, with several false positives appearing close to the top of the list, and the last few correct results being obscured by a large number of incorrectly ranked proposals.

The algorithm was designed with the goal of ranking the available annotations such that given a text description of an assay, the annotations that correctly apply to the document are listed before any which do not. A perfect result is considered to be any case where all of the correct proposals are ranked first. Because the objective of the machine learning is to assist and accelerate the human-guided curation, a handful of mis-ordered annotations can be considered as an inconvenience, rather than the means by which data becomes corrupted.

For evaluation purposes, a yardstick measure was defined as the null hypothesis being that the Bayesian-trained model using natural language processing performs no better than a trivial method, such as ranking all proposed annotations by the frequency with which they occur in the training set.

Cross validation was also investigated. The 983 fully annotated assays, with corresponding text from PubChem, were split into training and test sets using a simple partitioning algorithm. First of all, 208 documents were removed on account of having the same list of property:value annotations. These documents may differ by the free text annotations, but these are not included in the training set, and so duplicates need to be pruned. Of the remaining documents, entries were selectively picked for the test set in order to ensure that each annotation appears once in any one of the test set documents, but such that the number of instances remaining in the training set was not reduced below 2. The training set contained 698 documents, the test set 77.

The models were rebuilt using just the training set documents, and applied to the test set. For evaluation purposes, we can consider the ranking of correct vs. incorrect answers to be instructive for how well the model achieves its stated goal. FIG. 3 shows several plots that show the relative performance of the training and test sets.

The data for each plot is created according to the following procedure:
1. score each available annotation based on the model derived from the training set data;
2. pick the highest scoring annotation: if it is correct, add a positive mark, remove the annotation, and go to 1;
3. it is not correct, so add a negative mark, remove the annotation, and go to 2.

This essentially simulates an expert operator who only looks at the current top scoring annotation, and either approves it, or excludes it from further consideration. The process stops when all correct annotations have been approved.

Figure 3A:
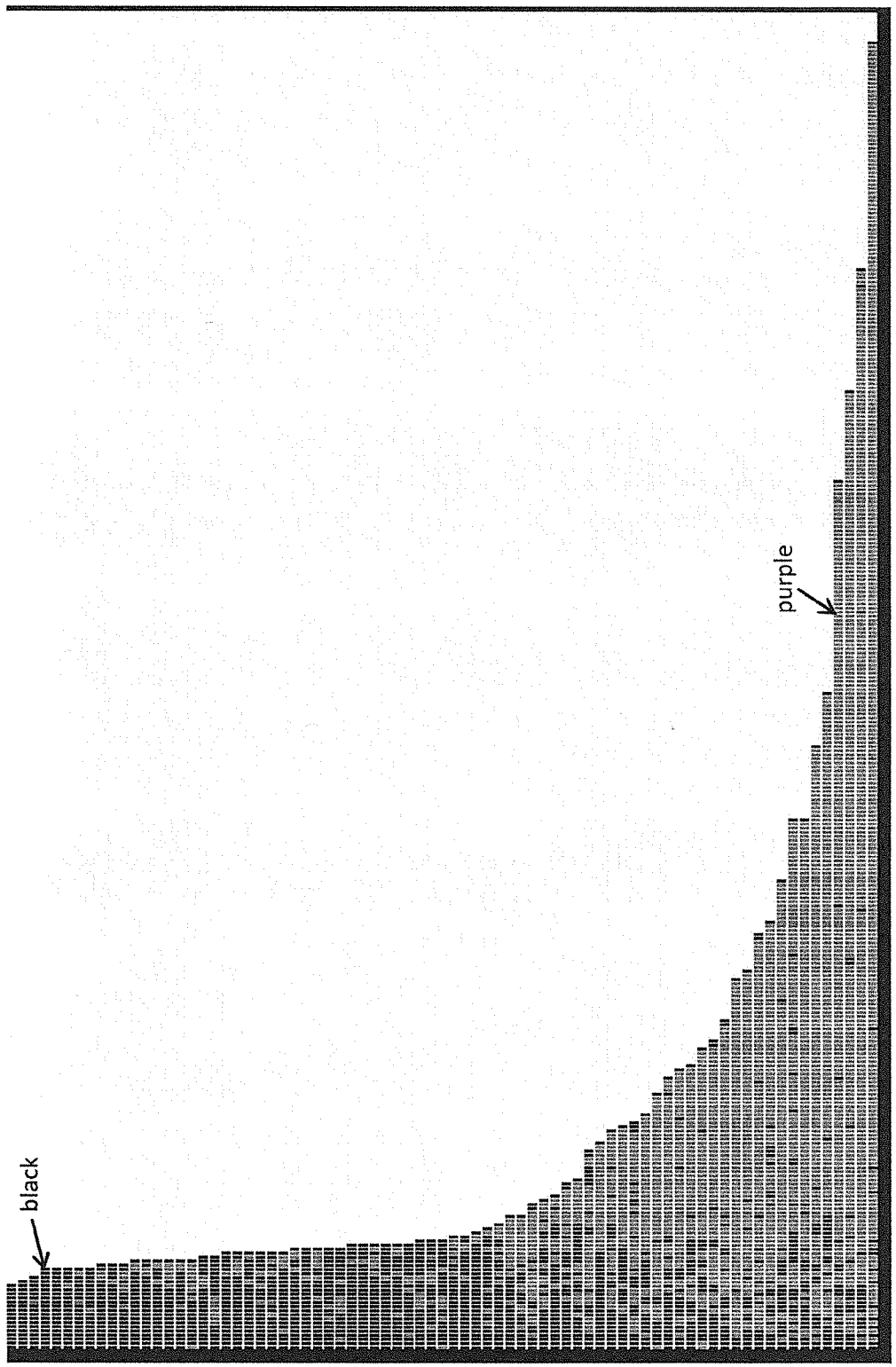
FIG. 3(a) is a plot of effectiveness of ranking of activities for hit/miss test data.

FIG. 3 illustrates this process graphically from several vantage points. For example, in FIG. 3(a) all of the test set documents are considered: for each line, running from left to right, a correct top ranking annotation is marked with a black square, while an incorrect top ranking annotation is marked with a purple square. Once all of the correct annotations have been picked, the remaining space is marked in grey. As can be seen, for the majority of cases the correct annotations are quickly picked out. Nonetheless there are a number of test documents that contain a small number of outliers, i.e. required annotations that are ranked very poorly, with many false positives getting a higher score.

Figure 3B:
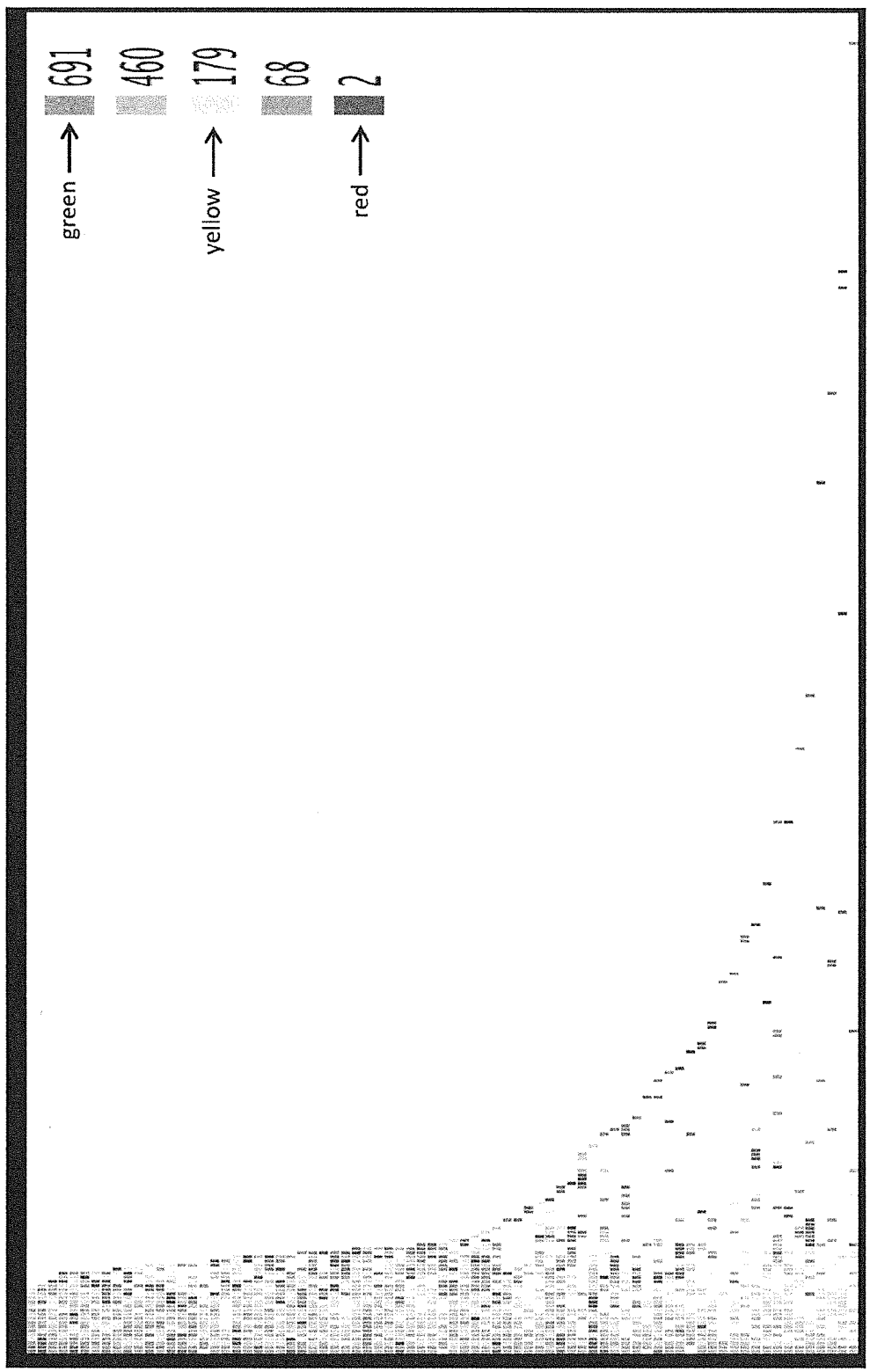
FIG. 3(b) is a plot of effectiveness of ranking of activities for heatmap for model size.

FIG. 3(b) shows the same data points, except that only the actual annotations are given a color. The color is determined by a heat map pattern, for which green indicates predictions that were derived from a well-populated model with many examples, while red indicates those for which very little training data was available. As can be seen, the outliers that rank very poorly relative to the false positives are all colored red, which strongly suggests that poor performance is due to sparsity of training data, rather than flaws with the method.

Figure 3C:
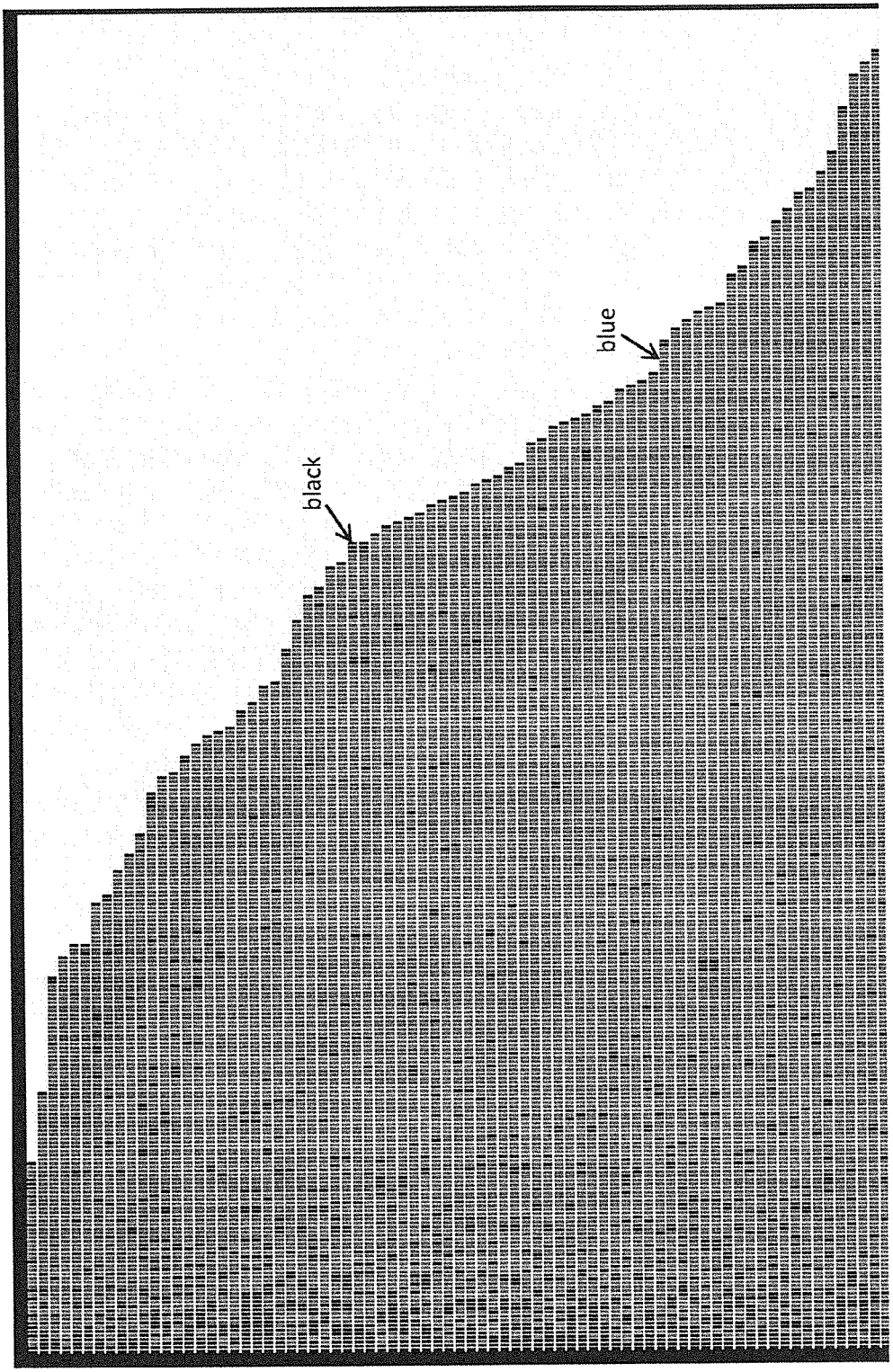
FIG. 3(c) is a plot of effectiveness of ranking of activities for null hypothesis.

In FIG. 3(c), the method for scoring documents is set to the frequency of each annotation in the overall training set, e.g. if an annotation occurs 100 times in 698 documents, its score is set to 0.143. The same proposed ranking order is used for all documents, regardless of the text description. This is used to test a reasonable null hypothesis, which is that picking the most common annotations is an effective way to separate correct from incorrect. While it can be clearly seen that the null hypothesis performs better than a random guess, at least for purposes of identifying true positives, it is vastly inferior to the proposals generated by the trained Bayesian-derived models, on account of the fact that every document has a very large number of false positives that need to be eliminated before the annotation is complete.

FIG. 3(d) shows the same process as for (a), except that in this case the training data is used, i.e. the models are used to predict the same documents from which they were trained. These results are superior to applying the models to the test set, which is to be expected.

The ultimate goal of combining machine learning with a user interface for bioassay annotation is to have the models predict all the correct annotations with close to perfect accuracy, and have the expert operator confirm these predictions. In practice this is realistic only when the document being annotated consists of cases that are well covered in the training set. Due to the nature of science, there will always be new methods being developed, which means that some of the corresponding annotations may have insufficient examples to create a model. It is also possible that the choice of phrasing for some of the assay details differs significantly from the language used by the examples in the training set, which can reduce the efficacy of the models, until additional data can be incorporated and used to re-train them.

For these reasons, the user interface needs to satisfy two main scenarios: 1) when the predictions are correct, and 2) when the document is unable to accurately predict the annotations. For the first scenario, confirming the correct annotations should be a matter of quickly scanning the highest scoring proposals and confirming the assignments. In these cases, the user interface must aspire to being unobtrusive. However, in the second scenario, when the correct annotation does not appear at the top of the list, the interface needs to provide ways for the user to hunt down the necessary annotations. Several options have been developed to help the user deal with this case. In near-ideal cases, the user may find the correct annotation by simply looking slightly further down the list of proposed annotations. Alternatively, the user may filter the results by selecting a particular category of annotations, and browse through this refined subset to find the correct annotation. Finally, if the user needs to include an annotation that is present in the ontology, but has not been included in the list of proposals because there is not enough data to build a model, the interface can provide assistance in searching through all of the unscored options. Furthermore, there will also be occasions when the desired annotation does not exist in the ontology, e.g. a previously unreported biological pathway, in which case it may be desirable to allow the user to enter the information as plain text. While this has little immediate value for semantic purposes, it could be considered as a placeholder for future additions to the underlying ontology, which could be upgraded retroactively.

Figures 4A, 4B:
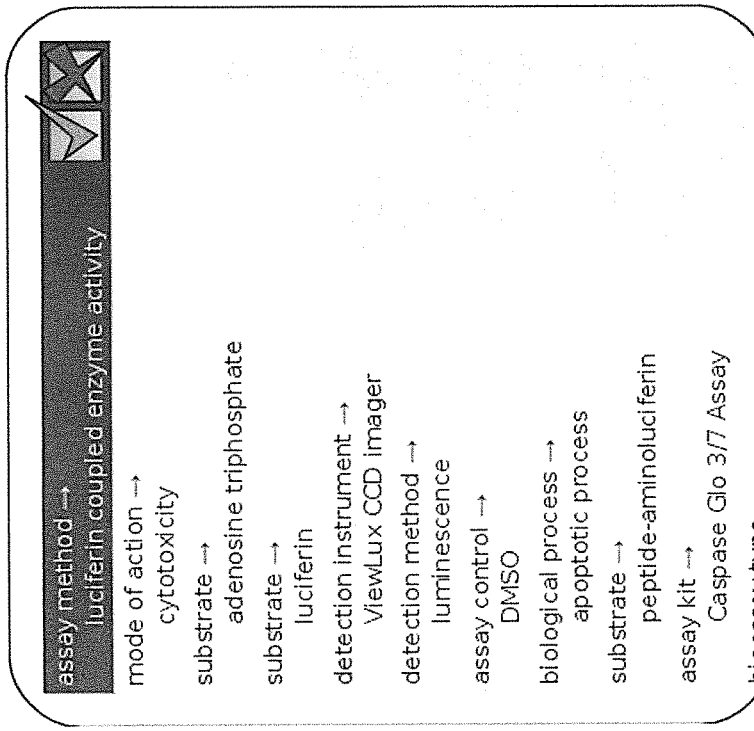
FIG. 4(a) is a schematic illustration of a portion of an interactive graphical user interface for annotating bioassays with guidance from pretrained models and showing a portion of a bioassay protocol.
FIG. 4(b) is a schematic illustration of an interactive graphical user interface for annotating bioassays with guidance from pretrained models and showing a selection of a plurality of properties and values.

A mockup of the core elements of this interface is shown in FIG. 4, which shows the same layout principles for the proof of concept application that we created for testing the machine learning methods and corresponding workflow. In particular, FIG. 4(a) illustrates a box within a user interface which allows a user to type in free text. The text can be cut-and-pasted from another application, or it can be typed in manually. The list shown in FIG. 4(b), which would also be present and viewable on the user interface, shows a series of annotations, consisting of property and value. The list is ranked with the highest first, and when the system is working perfectly the user can click on the approve button (the checkmark shown in the figure) for the highest scoring annotation. If the highest scoring annotation is not correct, the user may look further down the list in order to find one that is correct; or, they may reject an incorrect proposal using the X mark shown in the figure. In either case, the proposals are recomputed and a new list of options is shown.

Figure 4C:
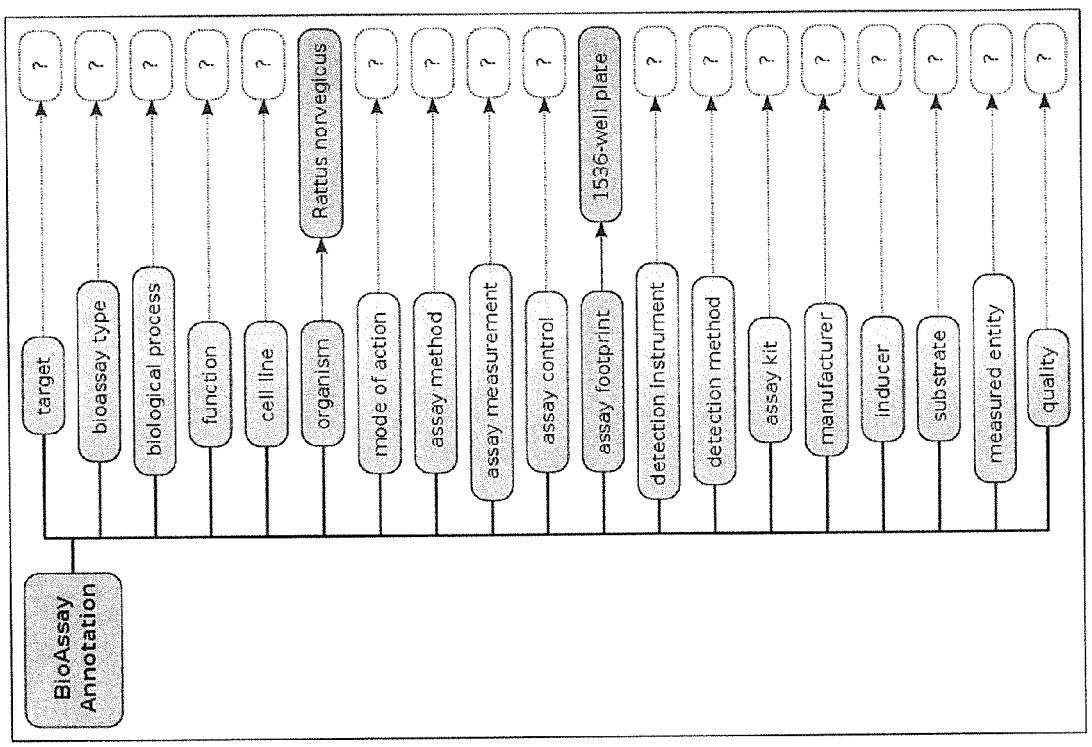
FIG. 4(c) is a schematic illustration of an interactive graphical user interface for annotating bioassays with guidance from pretrained models and showing a list of available properties used to organize annotations.

FIG. 4(c) shows a portion of the user interface in which all of the available properties which are used to organize the annotations are provided. For each property or category, there can be zero-or-more assigned annotations of the property:value form. This simple hierarchical arrangement clearly shows the annotations that have been assigned so far, and which properties have as yet no associations. Making the property icons clickable is a way to allow filtering of the annotation list, i.e. only showing the potential annotations that match the selected property. In this way, the operator can carefully pick out assignments for each of the property groups, which is a workflow that becomes important when working with documents that do not fall within the domain of pretrained data. This process of picking out the correct assignment can either be done by scrolling through the list of all possible annotations ranked according to the predictive score, or by partial text searching.

FIG. 5 shows the annotation of an assay, which can be found in PubChem Assay ID 761. The annotation text shown in FIG. 5(a) has been composed by concatenating the assay description and protocol text fields, and trimmed to remove superfluous content. This case is an example where the performance of the machine learning models is strong, but still requires a well-designed user interface for the portions that are less well covered.

Figure 5B:
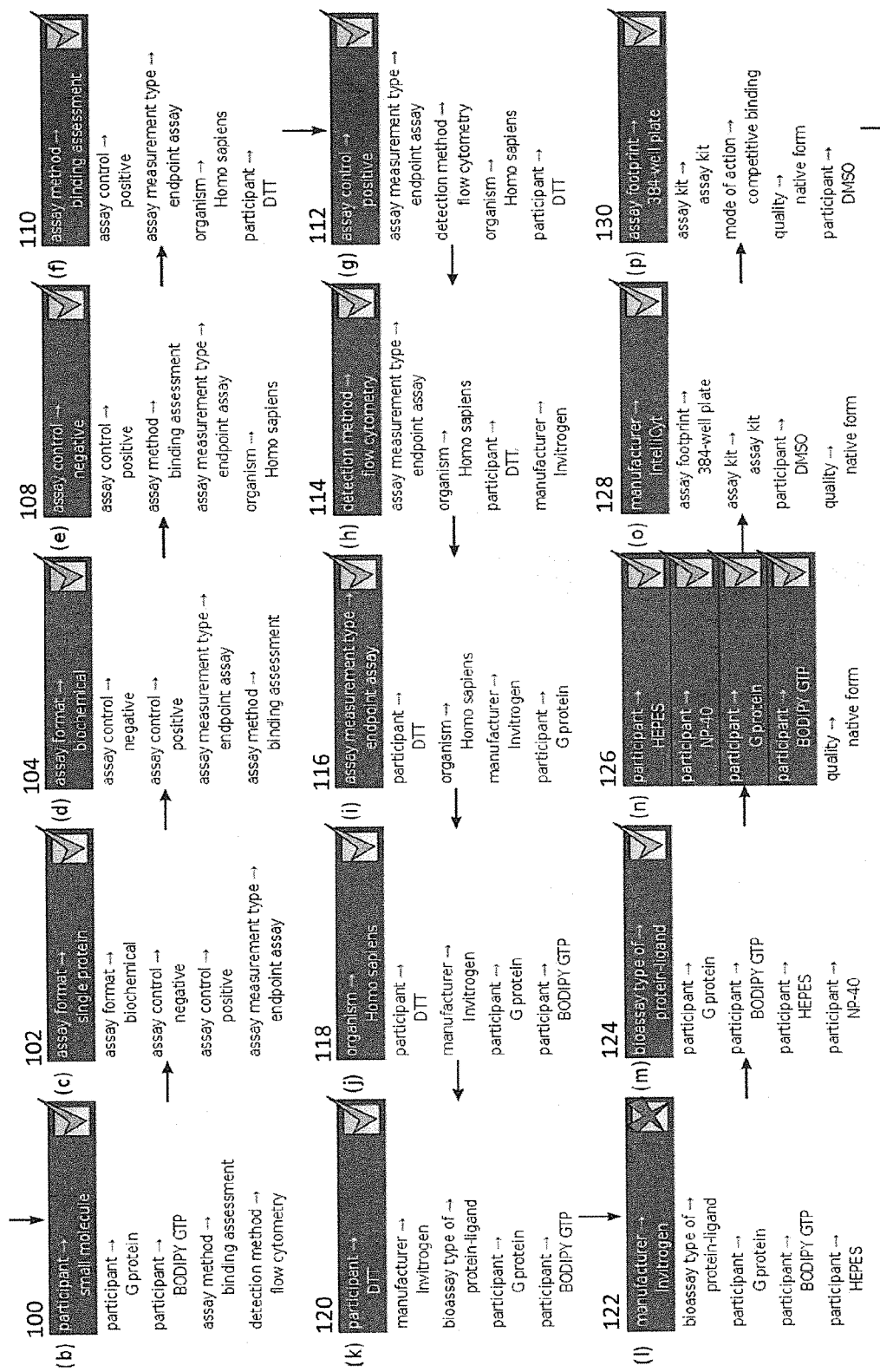
FIG. 5(b) is a schematic illustration of a stepwise annotation process for the bioassay protocol shown in FIG. 5(a) and showing a series of assignment steps.
Figure 5C:
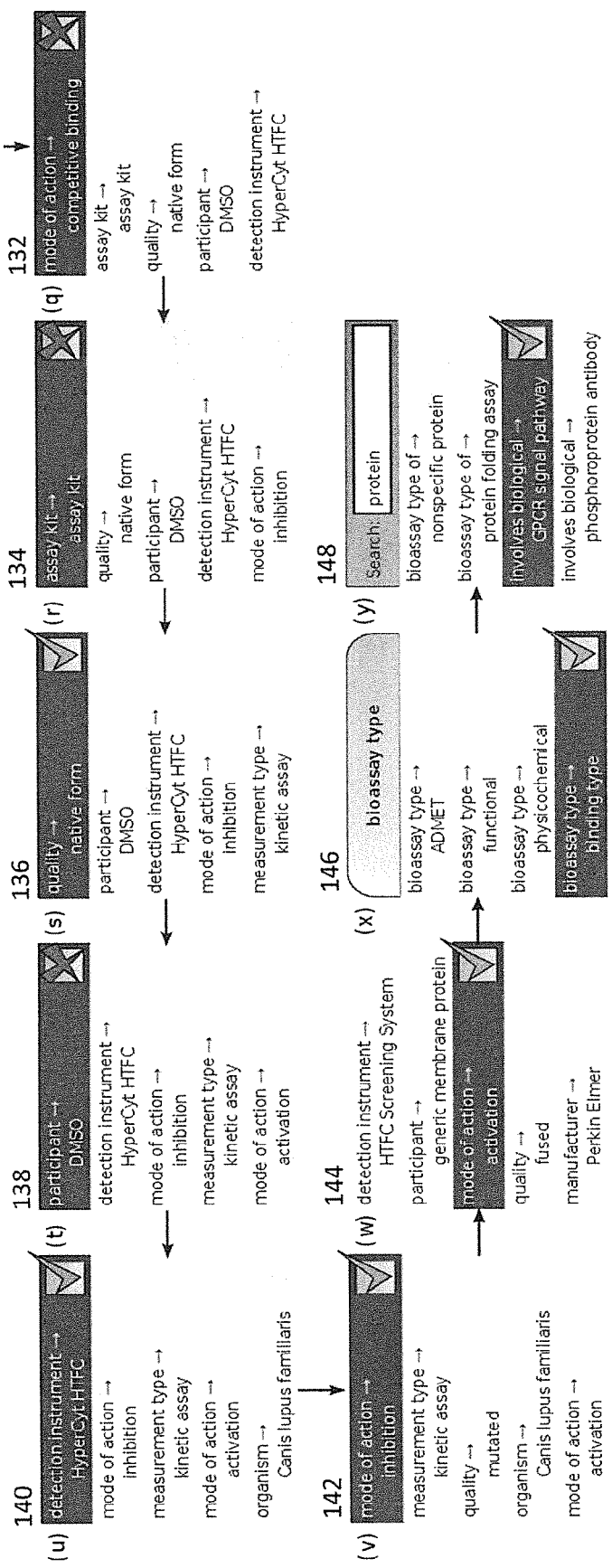
FIG. 5(c) is a schematic illustration of a stepwise annotation process for the bioassay protocol shown in FIG. 5(a) and illustrating additional assignment steps.

FIGS. 5(b) and 5(c) show a plurality of assignment steps 100-146 with most of these examples/steps illustrating the 5 highest ranked annotations. In most of the initial steps, e.g. steps 100-118, 122, 126, 128, 134, 138 and 140, the top ranked case is a correctly predicted annotation. A checkbox is used to indicate that the user confirms that presence of the annotation, and in the following step, the list of proposals is updated to reflect the modified scores, which take into account the correlation effects. In cases illustrated in steps 120, 130, 132, and 136, the top ranked prediction is incorrect, and a cross mark indicates that the user explicitly excludes the annotation from further consideration. In step 142 the desired annotation is further down the list, and so the user scrolls the proposals in order to select the next correct one. In step 144 the user selects the property bioassay type, which restricts the list of proposals to only those within that property group, which makes locating the correct annotation easier. In step 146 the desired annotation is difficult to find, since it is not in the training set, and so the user enters a search string, e.g. "protein," to narrow down the list and locate the correct annotation.

Figure 5D:
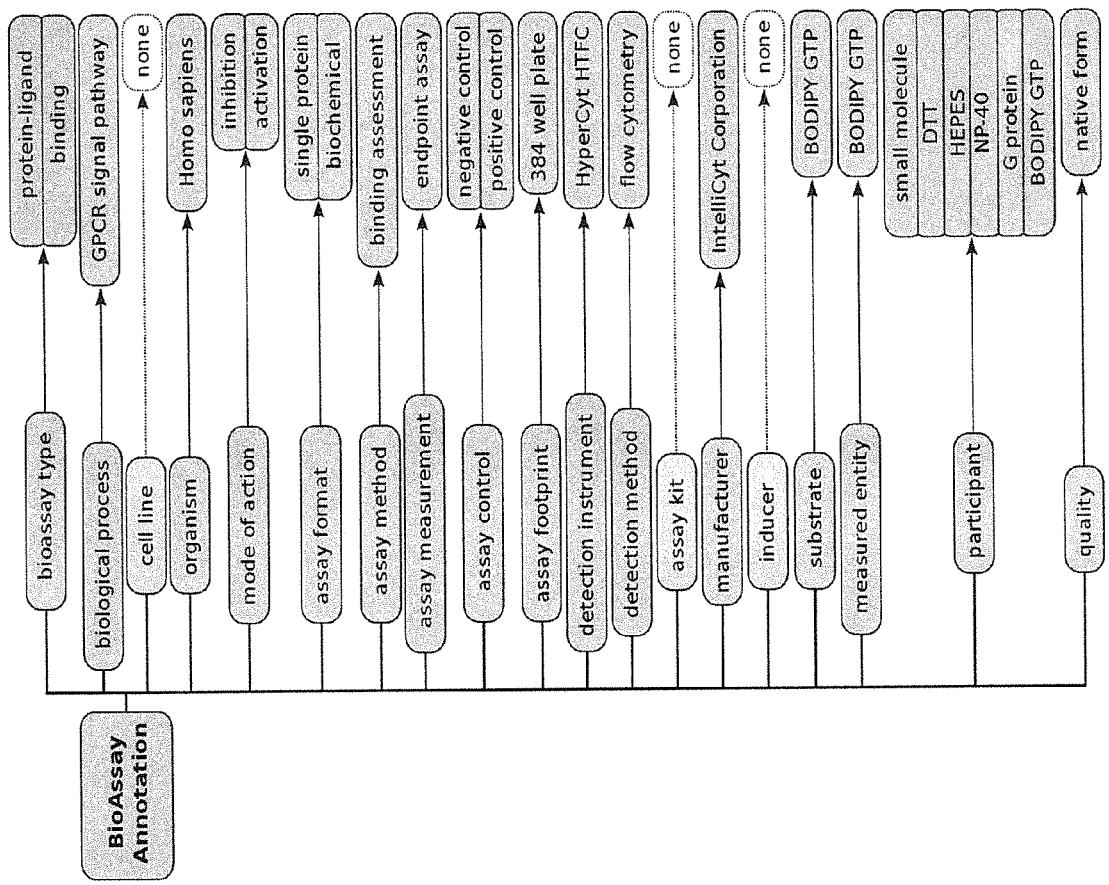
FIG. 5(d) is a schematic illustration of a complete list of annotations divided into property categories for the bioassay protocol shown in FIG. 5(a) and using the assignment steps illustrated in FIGS. 5(b) and 5(c).

In FIG. 5(d), the complete list of annotations, divided into property categories, is shown. This list is updated dynamically as each of the annotations shown in steps 100-146 is added to the collection.

The purpose of adding semantic annotations to bioassays is to enable a diverse range of queries and automated analysis, and one of the most effective ways to enable this is load the annotation markup into the same framework as the original BioAssay Ontology definition and all of its related dependencies.

The output from an annotated description can easily be expressed in terms of RDF triples. The properties and values are already mapped into the BAO space. A new URI needs to be defined for each of the assays being annotated. For example, the annotation example used earlier, converted into RDF "Turtle" format, is shown in Table 1 below.

TABLE 1

| @prefix | owl: | <http://www.w3.org/2002/07/owl#> . |
| @prefix | rdf: | <http://www.w3.org/1999/02/22-rdf-syntax-ns#> . |
| @prefix | tag: | <http://www.purl.org/ontology/tag/> . |
| @prefix | xml: | <http://www.w3.org/XML/1998/namespace> . |
| @prefix | xsd: | <http://www.w3.org/2001/XMLSchema#> . |
| @prefix | rdfs: | <http://www.w3.org/2000/01/rdf-schema#> . |
| @prefix | skos: | <http://www.w3.org/2004/02/skos/core> . |
| @prefix | bao: | <http://www.bioassayontology.org/bao#> . |

TABLE 1-continued

```
@prefix        :       <http://www.collaborativedrug.com/bao/curation.owl#> .
base classes for assays
: AnnotatedAssay
    rdfs: label "BioAssay with Annotations" ;
    rdf: type owl:Class ;
.
: PubChemAssay
    rdfs: label "Annotated Assay from PubChem" ;
    rdfs: subClassOf :Annotated Assay ;
.
curation of assays from PubChem using BioAssay Ontology properties & values
provided by Collaborative Drug Discovery, Inc.
all user-curated entries for PubChem assay #761
see: http://pubchem.ncbi.nlm.nih.gov/rest/pug/assay/aid/761/description/JSON
: AssayPubChem_761
    rdfs: label "Annotations for PubChem Assay ID 761" ;
    rdfs: subClassOf :PubChemAssay ;
    : PubChemAID "761" ;
    bao: BAO_0002855 bao: BAO_0000110 ; # "is bioassay type of" - > "protein-small molecule interaction assay"
    bao: BAO_0002854 bao: BAO_0000041 ; # "has bioassay type" - > "binding type"
    bao: BAO_0002009 # "involves biological process"
        <http://purl.obolibrary.org/obo/GO_0007186> ; # -> "GPCR signaling pathway"
    bao: BAO_0002921 # "has organism"
        <http://purl.obolibrary.org/obo/NCBITaxon_9606> ; # -> "Homo sapiens"
    bao: BAO_0000196 bao: BAO_0000091 ; # "has mode of action" - > "inhibition"
    bao: BAO_0000196 bao: BAO_0000087 ; # "has mode of action" - > "activation"
    bao: BAO_0000205 bao: BAO_0000357 ; # "has assay format" - > "single protein format"
    bao: BAO_0000205 bao: BAO_0000217 ; # "has assay format" - > "biochemical format"
    bao: BAO_0000212 bao: BAO_0000123 ; # "has assay method" - > "binding assessment method"
    bao: BAO_0000409 bao: BAO_0000410 ; # "assay measurement type" - "endpoint assay"
    bao: BAO_0000740 bao: BAO_0000079 ; # "has assay control" - > "negative control"
    bao: BAO_0000740 bao: BAO_0000080 ; # "has assay control" - > "positive control"
    bao: BAO_0002867 bao: BAO_0000515 ; # "has assay footprint" - > "384 well plate"
    bao: BAO_0002865 bao: BAO_0000943 ; # "uses detection instrument" - >
                                       # "HyperCyt High Throughput Flow Cytometry System"
    bao: BAO_0000207 bao: BAO_0000005 ; # "has detection method" - > "flow cytometry"
    bao: BAO_0000737 bao: BAO_0000946 ; # "has manufacturer" - > "IntelliCyt Corporation"
    bao: BAO_0002739 bao: BAO_0000931 ; # "has substrate" - > "BODIPY GTP"
    bao: BAO_0002000 bao: BAO_0000931 ; # "has measured entity" - > "BODIPY GTP"
    bao: BAO_0090012 bao: BAO_0000176 ; # "has participant" - > "small molecule"
    bao: BAO_0090012 bao: BAO_0000895 ; # "has participant" - > "DTT"
    bao: BAO_0090012 bao: BAO_0000693 ; # "has participant" - > "HEPES"
    bao: BAO_0090012 bao: BAO_0000978 ; # "has participant" - > "NP-40"
    bao: BAO_0090012 bao: BAO_0000368 ; # "has participant" - > "G protein"
    bao: BAO_0090012 bao: BAO_0000931 ; # "has participant" - > "BODIPY GTP"
    bao: BAO_0002662 bao: BAO_0002157 ; # "has quality" - > "native form"
```

Once in this format, the assertions can be loaded into an existing SPARQL server. At this point the content becomes accessible to the full suite of semantic technologies. Combining the generic querying capabilities of the SPARQL syntax, with the semantic structure of the BioAssay ontology, allows a variety of ad hoc questions to be answered.

For example, finding a list of annotated documents that make use of a specific assay kit:

```
SELECT ?aid WHERE
{
    ?assaykit rdfs:label "HTRF cAMP Detection Kit" .
    ?has rdfs:label "has assay kit" .
    ?document ?has ?assaykit .
    ?document cdd:PubChemAID ?aid
}
```

This simple query extracts a list of assay identifiers for anything that makes use of a specific manufacturer's cyclic AMP detector. Note that the property and value URIs are matched by cross referencing the label. Based on the training data, this query returns AID numbers 933, 940, 1080, 1402, 1403, 1421, 1422 and 488980.

A slightly more advanced query can extract information other than just document identifiers:

```
SELECT ?instrument ?aid WHERE
{
    ?document bao:BAO_0002855 bao:BAO_0000110 .
    ?document bao:BAO_0000196 bao:BAO_0000091 .
    ?document bao:BAO_0000207 bao:BAO_0000363 .
    ?document bao:BAO_0002865 ?q .
    ?q rdfs:label ?instrument .
    ?document cdd:PubChemAID ?aid
}
ORDER BY ?instrument ?aid
```

In this case the restrictions are specified by directly referencing the BAO tags, which searches for all protein-small molecule interaction assays, with inhibition as the mode of action, using fluorescence intensity measurements. For each match, the detection instrument is looked up and cross referenced by label:

| | |
|---|---|
| EnVision Multilabel Reader | 622 |
| PHERAstar Plus | 1986 |
| ViewLux ultraHTS Microplate Imager | 2323 |
| ViewLux ultraHTS Microplate Imager | 485281 |
| ViewLux ultraHTS Microplate Imager | 489008 |

The inheritance hierarchy of the BioAssay Ontology, and the ontologies it references, can also be utilized in queries. The following query looks for assays that target GPCRs of mammals:

```
SELECT ?organism ?aid WHERE
{
    ?mammal rdfs:label "mammalian" .
    ?target rdfs:subClassOf* ?mammal .
    ?target rdfs:label ?organism .
    ?document bao:BAO_0002921 ?target .
    ?q rdfs:label "G protein coupled receptor" .
    ?document bao:BAO_0000211 ?q .
    ?document cdd:PubChemAID ?aid
}
ORDER BY ?organism ?aid
```

The target variable is used to match any organism URI that is a subclass of mammals. The result is a number of assays for humans, rats and mice.

Each of these examples shows how the semantic markup of the annotated assays can be put to the test with very direct and specific ad hoc questions. These queries can be composed on the fly by software that provides a more intuitive user interface, or they can be used for developing new kinds of analyses by experts. They can be applied to just the bioassay data in isolation, or they can be spliced into the greater semantic web as a whole, and linked to all manner of other information resources, e.g. screening runs measuring drug candidates, or medical knowledge bases that go into more detail about the biological systems being assayed.

The hybrid interactive/machine learning system and/or process disclosed herein can also have a user interface in the form of a web application, which is incorporated into larger products that provide data capture functionality, such as the CDD Vault developed by Collaborative Drug Discovery Inc. or potentially public databases such as PubChem. The semantic annotations can be recorded alongside the text description, and immediately accessible, sharable, searchable and used by a variety of features that can provide reasoning capabilities based on this data.

One of the obvious advantages of having user-approved annotations stored in a centralized location is that the machine learning models can be retrained at periodic intervals, which will ensure that the ease with which users can rapidly annotate their assays continues to improve as more data is submitted. Also, as more data becomes available, the domain of the models will continue to grow: annotations that were previously left out of the model building process due to insufficient case studies will be added once they have been used.

Another potential advantage of centralization is that it provides a pathway for new semantic annotations, i.e. when the BioAssay Ontology and its dependencies do not provide an appropriate term, users can resort to using a free text placeholder. Such annotations can be examined on a regular basis, and either a manual or automated process can be devised to collect together repeated use of related terms, and define a new annotation (e.g. for a new class of biological target or a new measurement technique). This requires a single authority to decide on a universal resource identifier (URI) for the new term, which could be done by the service provider hosting the data, who may also take the opportunity to retroactively upgrade the existing examples of free text labels to use the freshly minted semantic annotation. We have also demonstrated creating a file containing RDF triples for the resulting annotations for a document, and harmonizing the data format with the Assay Definition Standard format can be executed.

In addition to working with potential users of this software, public content can be incorporated, e.g. content from large collection services such as PubChem, BARD, ChEMBL, OpenPHACTS and the like. There are a number of research groups exploring ways to add semantic markup to drug discovery data, including bioassays, and many of these annotations can be mapped to the BAO annotations that we have chosen for this project.

The instant invention can also be used in reverse, i.e. the software uses annotations to assemble a paragraph of plain English text, which is suitable for incorporation into a manuscript. In this case the workflow is different, e.g. the user types in a poorly formatted collection of terms involved in the assay in order to help the inference engine rank the likely suggestions, selects the appropriate terms, and then has the text produced by the software. Such a service can be of significant use to scientists who are not experienced with writing assay procedures according to the standard style guides.

Beyond the use of bioassays and BAO annotations for training data, the methodology developed is broadly applicable and not specific to this domain. Stated differently, other distinct subject areas of scientific publications can be used with the system and/or process disclosed herein, e.g. experimental details of chemical reactions, computational chemistry protocols, and other types of biological protocols beyond drug discovery, such as stem cell differentiation.

In summary, a system and/or process that has machine learning based on plain text assay descriptions and curated semantic markup, and is matched with a user interface that is optimized for making machine-assisted annotation very rapid and convenient when applied to text input that is well within the domain is provided. In addition, the inventive system and/or process is efficient for annotating assays that fall outside of the training set. By optimizing both the machine learning and user-centric workflow at the same time, the traps of both extremes are avoided, because both parts complement each other. Annotation of plain text by purely automated methods has been limited by the need to obtain an unrealistic level of accuracy, while purely manual annotation has to overcome a very high motivational barrier, given that most scientists are too busy to take on additional burdens, without an immediate benefit. In contrast, a very modest amount of human effort to a well-designed automated parser achieves highly accurate results and is a very useful technology in the hands of practicing scientists.

It is appreciated that as the quantity of semantically rich annotated data increases, the opportunities for delivering value to scientists increases in tandem. Making annotation easy is the first step, but it needs to be followed by new capabilities. As such, assay screens that provide easy comparison of experiments with others contained within the knowledgebase, and obtain a list of experiments and published papers with common features is provided within the scope of the invention. Researchers performing drug discovery modeling studies are thus able to gather together compounds that have been screened under certain conditions, and use the annotations to make a judgment call as to whether the measured activities can be incorporated into the same model. Additionally, researchers can search for artifacts, such as compounds that are disproportionately active in luminescent assays. New biological activities may also become mineable; for example, common hits between cell-based assays and target based assays may reveal unknown molecular mechanisms.

Beyond the specific domain of bioassay annotation, the hybrid approach to high level markup is appropriate to many different areas of science, where use of text jargon or anachronistic diagrams is the norm for conveying concepts that are amenable to a highly structured description. The understandable reluctance of scientists to redesign their communication methods for the benefits of software, and the inability of software to provide substantially useful results without such richly marked up data, is a proverbial chicken vs. egg scenario that can be observed throughout the scientific disciplines. Combining machine learning with modest demands on scientists' time, and rapid iteration of improved functionality, is a viable strategy for advancing the goals of computer assisted decision support.

The above embodiments, examples, etc. are provided for illustrative purposes only. Changes, modifications, etc. will be obvious to one skilled in the art and still fall within the scope of the invention. As such, it is the claims, and all equivalents thereof, which define the scope of the invention.

We claim:

1. A process for identifying, accurate selecting and storing scientific data in textual formats, the process comprising:
   providing a computer having an electronic control unit with a processor, memory, an algorithm for identifying key words and phrases that are present in a textual format and a user interface;
   identifying a plurality of natural language Part of Speech (POS)-tagged blocks in a plurality of text documents containing scientific data using the processor and a natural language program (NLP) algorithm;
   providing a plurality of possible annotations for each of the natural language POS-tagged blocks from an annotation database using the processor, each of the possible annotations for a given natural language POS-tagged block being a possible description of the natural language POS-tagged block;
   scoring and ranking each of the possible annotations for a given natural language POS-tagged block using the processor such that each of the possible annotations for a given natural language POS-tagged block has a score and is ranked relative to the other provided possible annotations;
   displaying each of the natural language POS-tagged blocks and ranked possible annotations to a user using the processor;
   the user selecting which of the ranked possible annotations for each natural language POS-tagged block is an accurate description using the user interface, selection of the annotation for each natural language POS-tagged block creating a plurality of natural language POS-tagged block-annotation pairs; and
   storing the plurality of natural language POS-tagged block-annotation pairs in the computer memory using the processor,
   wherein the processor scores each of the possible annotations for each natural language POS-tagged block using the expression:

$$score = \sum_n ln\left[\frac{A_{n+1}}{T_n * P + 1}\right]$$

where n is the natural language POS-tagged block, $A_n$ is the number of documents containing the annotation and the tagged block, $T_n$ is the total number of documents with the tagged block, and P is the fraction of documents containing the annotation.

2. The process of claim 1, wherein the NLP algorithm is a Bayesian model NLP algorithm.

3. The process of claim 1, wherein the plurality of text documents are a plurality of journal articles.

4. The process of claim 1, wherein the annotations are BioAssay Ontology (BAO) annotations.

5. The process of claim 4, wherein the plurality natural language POS-tagged block-annotation pairs are natural language POS-tagged block-BAO annotation pairs.

6. The process of claim 1, wherein the plurality of stored natural language POS-tagged block-annotation pairs are stored in an RDF triple format.

* * * * *

UNITED STATES PATENT AND TRADEMARK OFFICE
CERTIFICATE OF CORRECTION

| | | |
|---|---|---|
| PATENT NO. | : 9,594,743 B2 | Page 1 of 1 |
| APPLICATION NO. | : 14/792743 | |
| DATED | : March 14, 2017 | |
| INVENTOR(S) | : Barry A. Bunin, Nadia K. Litterman and Alex Clark | |

It is certified that error appears in the above-identified patent and that said Letters Patent is hereby corrected as shown below:

In the Specification

Column 1, Following the Cross-Reference to Related Applications section, please insert the following Section --Government License Rights This invention was made with government support under TR000185 awarded by the National Institute of Health. The government has certain rights in the invention.--

Signed and Sealed this
Twenty-first Day of April, 2020

Andrei Iancu
*Director of the United States Patent and Trademark Office*